US 8,243,274 B2

(12) United States Patent
Aiken et al.

(10) Patent No.: US 8,243,274 B2
(45) Date of Patent: Aug. 14, 2012

(54) PORTABLE DIESEL PARTICULATE MONITOR

(75) Inventors: Geoffrey Aiken, Albuquerque, NM (US); Trever Edward William Skilnick, Albuquerque, NM (US)

(73) Assignee: FLIR Systems, Inc., Wilsonville, OR (US)

( * ) Notice: Subject to any disclaimer, the term of this patent is extended or adjusted under 35 U.S.C. 154(b) by 345 days.

(21) Appl. No.: 12/720,551

(22) Filed: Mar. 9, 2010

(65) Prior Publication Data

US 2010/0225918 A1 Sep. 9, 2010

Related U.S. Application Data

(60) Provisional application No. 61/158,432, filed on Mar. 9, 2009.

(51) Int. Cl.
*G01N 21/00* (2006.01)

(52) U.S. Cl. ........................................................ 356/438

(58) Field of Classification Search ........................ None
See application file for complete search history.

(56) References Cited

U.S. PATENT DOCUMENTS

| | | | |
|---|---|---|---|
| 877,460 A | 1/1908 | Brunner et al. | |
| 902,958 A | 11/1908 | Galusha | |
| 906,038 A | 12/1908 | Lauder | |
| 1,603,878 A | 10/1926 | Smith | |
| 1,662,870 A | 3/1928 | Stancliffe | |
| 1,749,920 A | 3/1930 | Modave | |
| 1,807,378 A | 5/1931 | Budil | |
| 1,825,274 A | 9/1931 | Leach | |
| 2,937,780 A | 5/1960 | Beckwith | 220/560.14 |
| 2,939,545 A | 6/1960 | Silverman | |
| 3,001,914 A | 9/1961 | Andersen | |
| 3,469,934 A | 9/1969 | Bocard et al. | |
| 3,518,815 A | 7/1970 | McFarland et al. | 73/863.22 |
| 3,572,128 A | 3/1971 | Hemeon | 73/863.24 |
| 3,633,405 A | 1/1972 | Noll | 73/28 |
| 3,693,457 A | 9/1972 | Pilat | 73/432 |
| 3,754,868 A | 8/1973 | Witz et al. | 23/254 |
| 3,760,630 A | 9/1973 | Brumbaugh | 73/28 |
| 3,891,550 A | 6/1975 | Gray et al. | 210/67 |
| 3,901,798 A | 8/1975 | Peterson | 209/143 |
| 3,922,905 A | 12/1975 | Roth | 73/28 |

(Continued)

FOREIGN PATENT DOCUMENTS

DE 1 310 193 9/1934

(Continued)

OTHER PUBLICATIONS

Carrano et al., "Ultraviolet Light." *Spie's Oe magazine*: 20-23, Jun. 2003.

(Continued)

*Primary Examiner* — Tu Nguyen
(74) *Attorney, Agent, or Firm* — McAfee & Taft

(57) ABSTRACT

A diesel particulate matter (DPM) monitor that can be worn, attached to a particular location or piece of equipment, and collects real-time data about DPM levels. In an exemplary embodiment, ambient air is drawn by a flow-controlled diaphragm pump through a particle size selector which only passes submicron particles. These particles are collected on an optically transparent filter. A laser illuminates the filter and the transmittance of the laser beam is measured in real-time by a photo detector. As DPM accumulates on the filter, the laser transmittance decreases. The instrument is calibrated to convert this decrease in transmittance to a real-time concentration of elemental carbon in the air.

20 Claims, 9 Drawing Sheets

U.S. PATENT DOCUMENTS

| | | | |
|---|---|---|---|
| 3,932,151 A | 1/1976 | Lau | 55/229 |
| 3,942,357 A | 3/1976 | Jenkins | 73/23 |
| 3,970,428 A | 7/1976 | Barringer | 23/230 |
| 3,972,226 A | 8/1976 | Rountree et al. | 73/28 |
| 3,983,743 A | 10/1976 | Olin et al. | 73/28 |
| 3,997,297 A | 12/1976 | Jenkins et al. | 23/232 |
| 4,111,049 A | 9/1978 | Lerner et al. | 73/421.5 |
| 4,133,202 A | 1/1979 | Marple | 73/28 |
| 4,301,002 A | 11/1981 | Loo | 209/143 |
| 4,321,822 A | 3/1982 | Marple et al. | 73/28 |
| 4,350,571 A | 9/1982 | Erickson | 203/21 |
| 4,387,603 A | 6/1983 | Nelson | 73/863.22 |
| 4,415,265 A | 11/1983 | Campillo et al. | 356/338 |
| 4,452,068 A | 6/1984 | Loo | 73/28 |
| 4,473,384 A | 9/1984 | Lefkowitz | 55/290 |
| 4,580,440 A | 4/1986 | Reid et al. | 73/23 |
| 4,590,792 A | 5/1986 | Chiang | 73/28 |
| 4,640,140 A | 2/1987 | Burghoffer et al. | 73/863.22 |
| 4,670,135 A | 6/1987 | Marple et al. | 509/143 |
| 4,689,052 A | 8/1987 | Ogren et al. | 55/17 |
| 4,697,462 A | 10/1987 | Daube, Jr. et al. | 73/863.21 |
| 4,742,009 A | 5/1988 | Beverly et al. | 436/57 |
| 4,764,186 A | 8/1988 | Langer | 55/17 |
| 4,767,524 A | 8/1988 | Yeh et al. | 209/143 |
| 4,790,860 A | 12/1988 | Sexton | 55/59 |
| 4,820,920 A | 4/1989 | Bather | 250/282 |
| 4,872,972 A | 10/1989 | Wakabayashi et al. | 209/143 |
| 4,877,430 A | 10/1989 | Gutermuth | 55/269 |
| 4,877,516 A | 10/1989 | Schram | 209/155 |
| 4,941,899 A | 7/1990 | Liu | 55/270 |
| 4,942,294 A | 7/1990 | Johnson et al. | 250/304 |
| 4,961,966 A | 10/1990 | Stevens et al. | 427/299 |
| 4,972,957 A | 11/1990 | Liu et al. | 209/143 |
| 4,987,286 A | 1/1991 | Allen | 219/121.68 |
| 4,990,740 A | 2/1991 | Meyer | 219/121.52 |
| 5,039,490 A | 8/1991 | Marsoner et al. | 422/82.01 |
| 5,040,424 A | 8/1991 | Marple et al. | 73/863.23 |
| 5,063,164 A | 11/1991 | Goldstein | 436/169 |
| 5,128,539 A | 7/1992 | Rodgers et al. | 250/255 |
| 5,144,175 A | 9/1992 | Craggs | 310/63 |
| 5,162,810 A | 11/1992 | Onisawa et al. | 343/912 |
| 5,201,231 A | 4/1993 | Smith | 73/863.22 |
| 5,254,861 A | 10/1993 | Carpenter et al. | 250/573 |
| 5,294,410 A | 3/1994 | White | 422/171 |
| 5,299,141 A | 3/1994 | Hungerford et al. | 364/510 |
| 5,304,125 A | 4/1994 | Leith | 604/57 |
| 5,318,609 A | 6/1994 | Kittler | 55/443 |
| 5,326,537 A | 7/1994 | Cleary | 422/173 |
| 5,332,550 A | 7/1994 | Booker | 422/83 |
| 5,412,975 A | 5/1995 | Raabe et al. | 73/28.04 |
| 5,421,214 A | 6/1995 | Burgdorfer | 73/863.22 |
| 5,425,263 A | 6/1995 | Davies et al. | 73/28.05 |
| 5,425,802 A | 6/1995 | Burton et al. | 95/32 |
| 5,428,222 A | 6/1995 | Alexay | 250/343 |
| 5,437,198 A | 8/1995 | John | 73/863.22 |
| 5,461,473 A | 10/1995 | Pratt et al. | 356/141.3 |
| H1499 H | 11/1995 | Vance | 55/446 |
| 5,472,645 A | 12/1995 | Rock et al. | 261/79.1 |
| 5,498,271 A | 3/1996 | Marple et al. | 55/321 |
| 5,512,216 A | 4/1996 | Rock et al. | 261/79.1 |
| 5,518,697 A | 5/1996 | Dalla Betta et al. | 422/173 |
| 5,533,406 A | 7/1996 | Geise | 73/863.22 |
| 5,534,328 A | 7/1996 | Ashmead | 428/166 |
| 5,552,051 A | 9/1996 | Wang et al. | 210/604 |
| 5,553,795 A | 9/1996 | Tsai et al. | 241/40 |
| 5,584,557 A | 12/1996 | Alexay | 362/32 |
| 5,585,575 A | 12/1996 | Corrigan et al. | 73/863.71 |
| 5,658,537 A | 8/1997 | Dugan | 422/191 |
| 5,669,811 A | 9/1997 | Zaniewski | 454/16 |
| 5,681,752 A | 10/1997 | Prather | 436/53 |
| 5,693,895 A | 12/1997 | Baxter | 73/863.22 |
| 5,760,314 A | 6/1998 | Bromberg et al. | 73/863.21 |
| 5,776,754 A | 7/1998 | Caldwell | 435/240.2 |
| 5,786,894 A | 7/1998 | Shields et al. | 356/338 |
| 5,788,741 A | 8/1998 | Burton et al. | 95/32 |
| 5,811,062 A | 9/1998 | Wegeng et al. | 422/129 |
| 5,858,043 A | 1/1999 | Geise | 55/462 |
| 5,859,375 A | 1/1999 | Danylewych-May et al. | 73/864.71 |
| 5,914,091 A | 6/1999 | Holst et al. | 422/173 |
| 5,925,960 A | 7/1999 | Hayes | 310/211 |
| 5,932,795 A | 8/1999 | Koutrakis et al. | 73/28.01 |
| 5,935,339 A | 8/1999 | Henderson et al. | 134/1 |
| 5,942,699 A | 8/1999 | Ornath et al. | 73/863.21 |
| 5,949,001 A | 9/1999 | Willeke | 73/865.5 |
| 5,967,332 A | 10/1999 | Willeke | 209/132 |
| 5,997,619 A | 12/1999 | Knuth et al. | 96/224 |
| 6,001,145 A | 12/1999 | Hammes | 55/471 |
| RE36,489 E | 1/2000 | Alexay | 250/343 |
| 6,024,923 A | 2/2000 | Melendez et al. | 422/82.08 |
| 6,036,027 A | 3/2000 | Grimes | 209/725 |
| 6,062,392 A | 5/2000 | Birmingham et al. | 209/143 |
| 6,070,658 A | 6/2000 | Cipriani | 165/166 |
| 6,082,439 A | 7/2000 | Kato et al. | 165/79 |
| 6,082,445 A | 7/2000 | Dugan | 165/167 |
| 6,101,886 A | 8/2000 | Brenizer et al. | 73/863.23 |
| 6,110,247 A | 8/2000 | Birmingham et al. | 55/442 |
| 6,125,845 A | 10/2000 | Halvorsen et al. | 128/200.24 |
| 6,193,587 B1 | 2/2001 | Lin et al. | 451/56 |
| 6,194,731 B1 | 2/2001 | Jeys et al. | 250/461.2 |
| 6,217,636 B1 | 4/2001 | McFarland | 95/216 |
| 6,235,002 B1 | 5/2001 | Carver, Jr. et al. | 604/183 |
| 6,240,768 B1 | 6/2001 | Lemmonnier | 73/28.05 |
| 6,267,016 B1 | 7/2001 | Call et al. | 73/863.22 |
| 6,284,025 B1 | 9/2001 | Kreisberg et al. | 95/267 |
| 6,293,861 B1 | 9/2001 | Berry | 454/255 |
| 6,324,927 B1 | 12/2001 | Ornath et al. | 73/864.33 |
| 6,334,365 B1 | 1/2002 | Linker et al. | 73/864.81 |
| 6,363,800 B1 | 4/2002 | Call et al. | 73/863.22 |
| 6,370,406 B1 | 4/2002 | Wach et al. | 600/310 |
| 6,386,015 B1 | 5/2002 | Rader et al. | 73/31.05 |
| 6,392,313 B1 | 5/2002 | Epstein et al. | 290/52 |
| 6,435,043 B1 | 8/2002 | Ferguson et al. | 73/863.22 |
| 6,443,314 B2 | 9/2002 | Shiraiwa et al. | 210/474 |
| 6,488,900 B1 | 12/2002 | Call et al. | 422/173 |
| 6,511,854 B1 | 1/2003 | Asanov et al. | 436/518 |
| 6,532,067 B1 | 3/2003 | Chang et al. | 356/318 |
| 6,532,835 B1 | 3/2003 | Saaski et al. | 73/863.21 |
| 6,573,836 B1 | 6/2003 | Gitis et al. | 340/603 |
| 6,610,977 B2 | 8/2003 | Megerle | 250/287 |
| 6,639,733 B2 | 10/2003 | Minano et al. | 359/728 |
| 6,695,146 B2 | 2/2004 | Call et al. | 209/143 |
| 6,707,539 B2 | 3/2004 | Selinfreund et al. | 356/71 |
| 6,729,196 B2 | 5/2004 | Moler et al. | 73/863.22 |
| 6,805,751 B2 | 10/2004 | Allen | 134/1 |
| 6,826,422 B1 | 11/2004 | Modell et al. | 600/407 |
| 6,829,919 B2 | 12/2004 | Sioutas et al. | 73/865.5 |
| 6,834,533 B2 | 12/2004 | Megerle | 73/45.4 |
| 6,852,970 B2 | 2/2005 | Yamada et al. | 250/288 |
| 6,885,440 B2 | 4/2005 | Silcott et al. | 356/73 |
| 6,887,710 B2 | 5/2005 | Call et al. | 436/53 |
| 6,908,567 B2 | 6/2005 | Uziel | 216/66 |
| 6,949,147 B2 | 9/2005 | Uziel et al. | 134/1 |
| 6,984,524 B2 | 1/2006 | Nguyen et al. | 436/172 |
| 7,091,870 B2 | 8/2006 | Tsutsumi et al. | 340/632 |
| 7,096,125 B2 | 8/2006 | Padmanabhan et al. | 702/24 |
| 7,106,442 B2 | 9/2006 | Silcott et al. | 356/338 |
| 7,113,277 B2 | 9/2006 | Craig | 356/318 |
| 7,173,257 B1 | 2/2007 | Warrick et al. | 250/458.1 |
| 7,205,152 B2 | 4/2007 | Swider | 426/1 |
| 7,261,008 B2 | 8/2007 | Saaski et al. | 73/863.22 |
| 7,265,669 B2 | 9/2007 | Call et al. | 340/539.26 |
| 7,304,259 B2 | 12/2007 | Schwarz et al. | 209/584 |
| 7,578,973 B2 | 8/2009 | Call et al. | 422/83 |
| 7,591,980 B2 | 9/2009 | Call et al. | 422/91 |
| 7,622,693 B2 * | 11/2009 | Foret | 219/121.43 |
| 7,720,597 B2 | 5/2010 | Flick | 700/117 |
| 7,799,567 B1 | 9/2010 | Call | 436/53 |
| 2001/0047136 A1 | 11/2001 | Domanik et al. | 600/473 |
| 2002/0166390 A1* | 11/2002 | Graze, Jr. | 73/863.61 |
| 2003/0024806 A1* | 2/2003 | Foret | 204/164 |
| 2004/0028561 A1 | 2/2004 | Daugherty et al. | 422/58 |
| 2004/0063197 A1 | 4/2004 | Tilles et al. | 435/287.2 |
| 2004/0124366 A1 | 7/2004 | Zeng et al. | 600/473 |
| 2005/0070025 A1 | 3/2005 | Mooradian et al. | 250/461.1 |

| | | | | |
|---|---|---|---|---|
| 2006/0030790 | A1 | 2/2006 | Braig et al. | 600/584 |
| 2006/0257853 | A1 | 11/2006 | Herman | 435/6 |
| 2008/0281528 | A1 | 11/2008 | Relle, Jr | 702/19 |

FOREIGN PATENT DOCUMENTS

| | | |
|---|---|---|
| DE | 2 260 729 | 5/1974 |
| EP | 0 543 108 | 5/1993 |
| JP | 59196713 | 11/1984 |
| KR | 10-0497514 | 7/2005 |
| KR | 10-0549222 | 2/2006 |
| WO | WO 98/58725 | 12/1998 |
| WO | WO 03/089661 | 10/2003 |
| WO | WO 03/089907 | 10/2003 |
| WO | WO 2007/123349 | 11/2007 |

OTHER PUBLICATIONS

Cassarly, William. "Taming Light: Non-imaging optical systems focus on transferring light efficiently and controlling its distribution." *Spie's Oe magazine*: 7pp. Dec. 2002. <http://www.oemagazine.com/fromTheMagazine/dec02/taminglight.html>.

Cousins, Daniel. "Biodefense of Passenger Aircraft." Biodefense Systems Group, MIT Lincoln Laboratory. Presented at FAA Center of Excellence. 23pp. Jan. 19, 2005.

de la Mora, J.F., "Aerodynamic Focusing of Particles and Heavy Molecules: First Annual Report." *NTIS*: 16pp., Feb. 16, 1988.

de la Mora, J.F., "Aerodynamic Focusing of Particles and Heavy Molecules: Final Report." *NTIS*: 9pp., Jan. 8, 1990.

de la Mora, J.F., "Drastic Improvement of the Resolution of Aerosol Size Spectrometers via Aerodynamic Focusing: The Case of Variable-Pressure Impactors." *Chemical Engineering Communications*. vol. 151: 101-124, 1996.

de la Mora et al., "Aerodynamic Focusing of Particles in a Carrier Gas." *Journal of Fluid Mechanics*. vol. 195: 1-21, Oct. 1988.

Fernandez-Feria et al., "Brownian-Motion Limited Aerodynamic Focusing of Heavy Molecules." *Rarefied Gas Dynamics*, Beylich, A.E., Ed., Proceedings of the 17th International Symposium on Rarefied Gas Dynamics: 214-221, Jul. 8-14, 1990.

Foot et al., "Characterising single airborne particles by fluorescence emission and spatial analysis of elastic scattered light." Proceedings of SPIE, vol. 5617: Abstract only, 2pp, Dec. 2004.

Frye-Mason et al., "Novel fluorescence-based integrated sensor for chemical and biological agent detection." Proceedings of SPIE, vol. 5617: Abstract only, 2pp., Dec. 2004.

Fuerstenau et al., "Visualization of Aerodynamically Focused Subsonic Aerosol Jets." *Journal of Aerosol Science*. vol. 25, No. 1: 165-173, Jan. 1994.

Giechaskiel et al., "A metric for health effects studies of diesel exhaust particles," *Aerosol Science* vol. 40: 639-651, 2009.

Hochrainer, D., Institut fur Aerobiologie. "Measurement of Aerosol Particle Size Distribution with an Improved Spectral Impactor." *NTIS* No. N7323533: 26pp., 1973.

Huston et al., "Optical classification of bioaerosols using UV fluorescence and IR absorption spectroscopy." Proceedings of SPIE, vol. 5617: Abstract only, 2pp., Dec. 2004.

Jensen et al., "Sampling and Characteristics of Bioaerosols." *NIOSH: Manual of Analytical Methods*: 82-112, Jan. 15, 1998.

Jeys et al., "Development of UV LED based biosensor." Proceedings of SPIE, vol. 5071: 234-240, 2003.

Jurcik et al., "On the Shape of Impactor Efficiency Curves." *Journal of Aerosol Science*, vol. 26, No. 7: 1139-1147, 1995.

Kaye et al., "A low-cost multi-channel aerosol fluorescence sensor for networked deployment." University of Hertfordshire (UK) and Defence Science Technology Lab (UK) 11pp, 2005 Copyright SPIE—The international Society for Optical Engineering. <http://spiedl.aip.or/GetabsServlet?prog=normal&id=PSISDG00561700000 . . . >.

Kunzli et al., "Public health impact of outdoor and traffic-related air pollution: a European assessment," *Lancet* vol. 356: 795-801, 2000.

Lee et al., "Development and application of personal respirable particulate samplers (PRPS)," *Atmospheric Environment* vol. 40: 212-224, 2006.

Liu et al., "Optimizing the Detection Efficiency of a Low Pressure, In-Situ Particle Monitor Using Aerodynamic Focusing Lenses." 1996 Proceedings—Institute of Environmental Sciences: 217-224, 1996.

Noll et al., "Relationship between elemental carbon, total carbon, and diesel particulate matter in several underground metal/non-metal mines," *Environmental Science & Technology* vol. 41, No. 3: 710-716, 2007.

Noll et al., "Using laser absorption techniques to monitor diesel particulate matter exposure," *Smart Biomedical and Physiological Sensor Technology, Proceedings of SPIE* vol. 6759: 11pp., 2007.

Primmerman, Charles., "Detection of Biological Agents." *Lincoln Laboratory Journal*, vol. 12, No. 1: 3-32, 2000.

Wittmaack, Klaus., "In search of the most relevant parameter for quantifying lung inflammatory response to nanoparticle exposure: particle number, surface area, or what?" *Environmental Health Perspectives* vol. 115, No. 2: 187-194, 2007.

Environmental Protection Agency (U.S.) "Health assessment document for diesel engine exhaust", EPA/600/8-90/057F: 669pp., May 2002.

\* cited by examiner

PORTABLE DIESEL PARTICULATE MONITOR

RELATED APPLICATIONS

This application is based on a prior copending provisional application Ser. No. 61/158,432, filed on Mar. 9, 2009, the benefit of the filing date of which is hereby claimed under 35 U.S.C. §119(e).

BACKGROUND

Premature death and illness from particulate air pollution is one of the leading preventable public health problems in the United States. Researchers estimate that as many as 60,000 people in the U.S. die each year due to exposure to fine air particulates. A recent study found that the toll from diesel particulate exposure alone is 21,000 deaths annually in the U.S., as well as 27,000 non-fatal heart attacks, 410,000 asthma attacks, and 2.4 million lost work days, with a total economic cost of $139 billion. This cost in lives exceeds that of deaths due to drunk driving and homicide combined. Diesel exhaust is regarded by the U.S. Environmental Protection Agency (EPA) as a probable human carcinogen. Air particulates have been found to cause cardiovascular disease and mortality and large numbers of cases of bronchitis and asthma. Particulate matter about 10 microns in size (PM10) and 2.5 microns in size (PM2.5) are described by the EPA as Criteria Air Pollutants.

These health impacts are particularly severe for populations exposed to high concentrations of air particulates. Underground miners are exposed to some of the highest levels of diesel particulates of any occupation, due to the confined workspaces and continuous use of diesel equipment.

The health problems from inhaled particulates are a combination of the size and morphology of the micron and submicron particles (mostly carbon) themselves and the often toxic and carcinogenic organic compounds adsorbed on them. Both epidemiologic and in vitro studies have found correlations between particle size and shape and inflammatory potential and immunologic response; often the smallest particles appear to be the most damaging. Particles may also be coated with adsorbed polycyclic aromatic hydrocarbons, nitro-aromatics, combustion by-products, and heavy metals. These components are independently recognized by the EPA and other agencies as probable human carcinogens and toxic air pollutants. This makes diesel particulates particularly dangerous. While the gaseous products of combustion can also have adverse effects on health, most of the health impacts are believed to be due to the particulate component of combustion exhaust.

Because of this health hazard to miners, in the U.S., exposure of underground metal/non-metal miners to diesel particulate matter (DPM) is regulated by the Mine Safety and Health Administration (MSHA). DPM is regulated by limiting total submicron g/m3 on an eight hour time weighted carbon (TC) exposure levels to 160 µg/m$^3$ average. TC is determined using the MSHA method for converting elemental carbon (EC), which can be measured directly, to TC, which itself is the sum of EC and organic carbon (OC).

Most particulate air pollution studies use air samplers that trap particles on a filter that must then be sent to an analytical laboratory for subsequent analysis. The NIOSH 5040 method is used by MSHA for DPM measurement in mines. This method employs a pump to draw air through a particle size selector and onto a quartz filter. After a specified period of sampling (typically eight hours) the filter is sent to an analytical laboratory for thermo-optical analysis which yields TC, EC, and OC values.

The NIOSH 5040 method is accurate and reliable, but has serious drawbacks. First, it integrates the exposure to particulates over the entire sampling time. Therefore, adapting worker schedules to cycling particulate levels is virtually impossible. Second, if employed as a mobile or personal monitor, all location data is lost due to this constant integration. This data would be invaluable to a mine ventilation engineer wishing to know when and where ventilation is inadequate. Third, the cost and effort of handling the samples and the laboratory analysis discourage frequent use of the method (the cost of a 5040 test is about $100 to generate a single number; this does not include the cost to the mine operation for sampling and filter handling). Fourth, and perhaps most seriously, there is a two to three week turnaround time before test results are available to the mine. This prevents any real-time adjustment to the mine's ventilation, personnel, or equipment use to modify DPM exposures. Overexposure to DPM can thus be detected using this analysis method but not prevented. Sampler methods cannot be used for active control of combustion particle generation or site ventilation to reduce human exposures to hazardous levels of particulates.

Consequently, there exists a great need for a low-cost, sensitive, and accurate elemental or total carbon air particulate monitor for mines.

SUMMARY

This application specifically incorporates by reference the disclosures and drawings of each patent application and issued patent identified above as a related application.

Disclosed herein is a DPM monitor that can be used to detect DPM concentration in real-time. The DPM monitor can be worn, attached to a particular location or piece of equipment, and collects real-time data about DPM levels. In each embodiment, ambient air is drawn by a flow-controlled diaphragm pump through a particle size selector which only passes submicron particles. These particles are collected on an optically transparent filter. A laser illuminates the filter and the transmittance of the laser beam is measured in real-time by a photo detector. As DPM accumulates on the filter, the laser transmittance decreases. The instrument is calibrated to convert this decrease in transmittance to a real-time concentration of elemental carbon in the air. Various additional features and elements, described in greater detail below, provide enhancements to the basic design noted above.

In an exemplary embodiment, the DPM includes a portable housing including a sample cassette door, a sample cassette support disposed with the housing, and a replaceable sample cassette to be positioned on the sample cassette support. The sample cassette includes an optically transmissive sampling substrate onto which DPM are uniformly deposited. The sample cassette is introduced into the housing via the sample cassette door. The sample cassette is in fluid communication with an intake component that separates a DPM fraction from ambient air, such that the separated DPM fraction includes DPM entrained in air. The intake component can be beneficially implemented using a combination of a cyclone and a virtual impactor. In some embodiments disclosed herein, the intake component is disposed externally of the housing, while in other embodiments the intake component is enclosed within the housing.

The DPM monitor further includes a pump disposed in the housing and coupled in fluid communication with the intake component and the sample cassette, enabling the DPM fraction to be introduced into the sample cassette. A laser is disposed in the housing and positioned to direct a beam of light onto the optically transmissive substrate. A light detector is disposed in the housing and positioned to receive the beam of light after the beam passes through the optically transmissive substrate. The DPM deposited onto the substrate attenuates the beam, and the amount of attenuation can be correlated to the amount of DPM that has been collected. The DPM monitor also includes a controller disposed in the housing and logically coupled to the laser, the light detector, an output (such as a display, a speaker, or one or more lights), and the pump. The controller implements at least the function of using data from the light detector to provide an indication of DPM via the output. A battery supplies power to the pump, the laser, the output, and the controller.

In at least one embodiment, the sample cassette is a rigid support. An exemplary material is aluminum, although rigid polymers could also be employed. In a related embodiment, the sample cassette support is configured such that the sample cassette can only be inserted into the sample cassette support in a proper orientation, to prevent a user from inadvertently inserting the sample cassette in an improper orientation. If desired, the sample cassette support can also provide support for the laser and the light detector.

In at least one embodiment, the sample cassette door is logically coupled to the controller, and the controller is further configured to prevent the laser from firing if the sample cassette door is not closed.

In at least one embodiment, the controller is further configured to evaluate a signal from the light detector, to determine when the optically transmissive sampling substrate has been saturated with DPM, and to output an indication to a user that the sample cassette should be replaced. The output can be in the form of a warning light, a message presented on a display, or as an audible alarm.

In at least one embodiment, the battery is removably coupled to an external surface of the housing, enabling the battery to be replaced without opening the housing.

In at least one embodiment, each element of the DPM monitor is integrated into a helmet to be worn by a user, such that no additional components need to be strapped onto the user's belt or torso.

If desired, a memory can be included in the DPM monitor, in which data from the light detector can be stored, the memory being logically coupled to the controller. A serial port or USB port can be included to allow such data to be transferred to a remote device. Other networking components, such as Ethernet ports or Wi-Fi capability, can be incorporated into the DPM to facilitate transferring collected data to a remote device.

In at least one embodiment, the controller is further configured to activate the alarm when the optically transmissive sampling substrate has been saturated with DPM (such that a fresh sample cassette should be inserted), and/or a predetermined DPM level has been exceeded.

In at least one embodiment, the controller is further configured to change a flow rate of the pump based on user input, to enable a user to select a relatively higher flow rate optimized for sensitivity detection, and a relatively lower flow rate optimized for longevity of the optically transmissive sampling substrate.

In at least one embodiment, the controller is further configured to change a gain setting of the light detector based on user input.

In at least one embodiment, the controller is further configured to convert data from the light detector into an elemental carbon (EC) parameter, and to convert the EC parameter into eight hour time weighted carbon (TC) exposure levels, based on user input.

It should be recognized that the elements discussed above can be combined in various combinations and permutations, to implement many different embodiments.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 2:
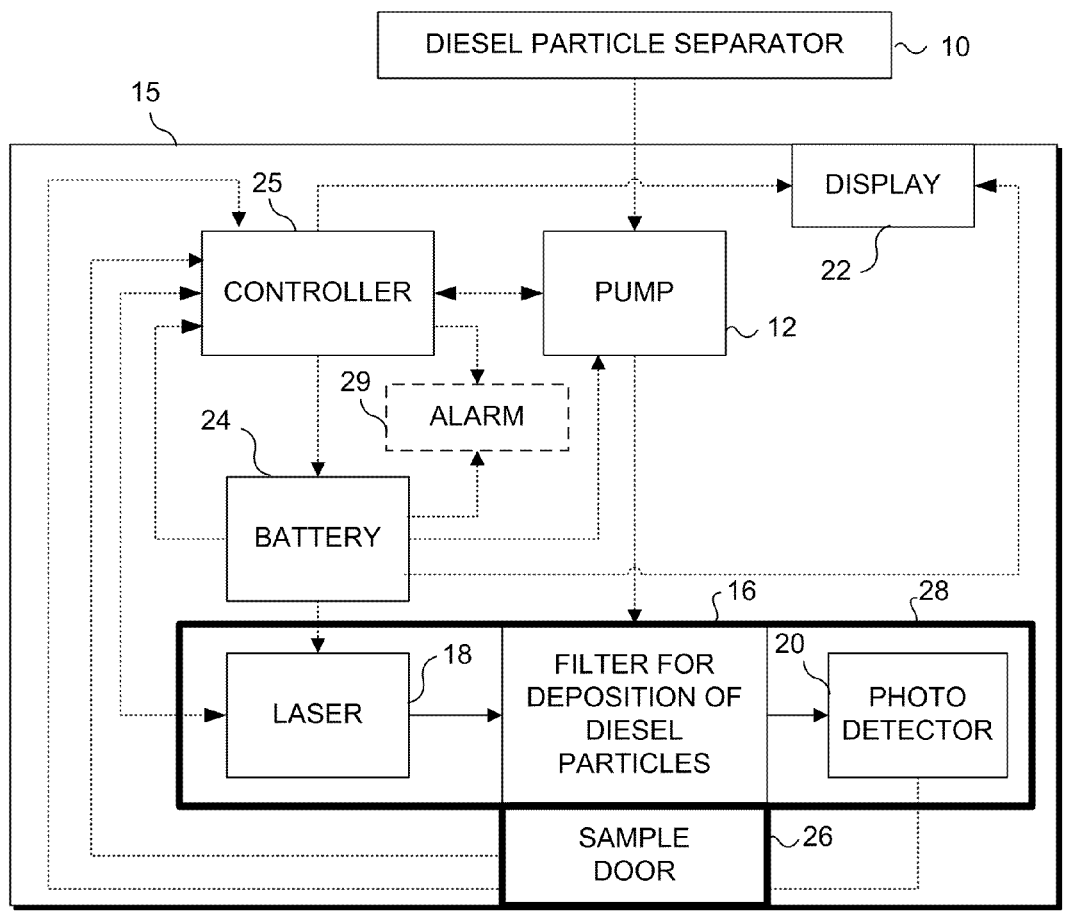
FIG. 2 is a functional block diagram of an improved portable DPM monitor as disclosed herein.
Figure 9A:
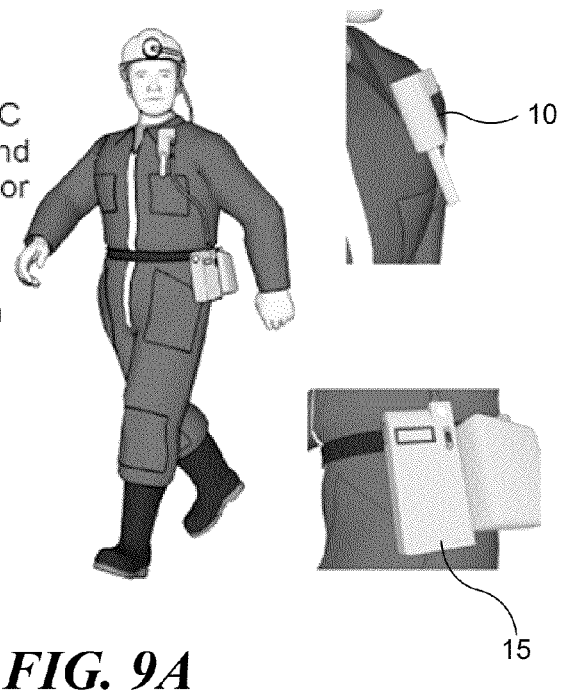
Figure 9B:
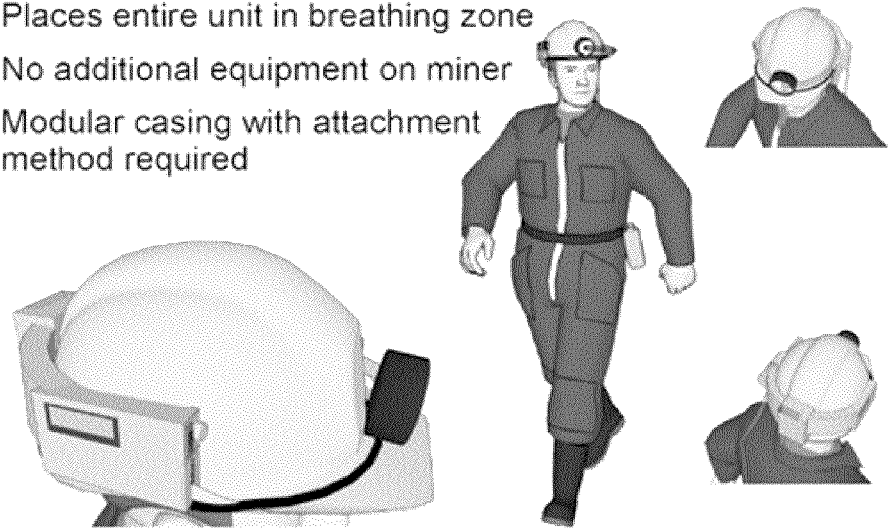
Figure 9C:
Figure 10:
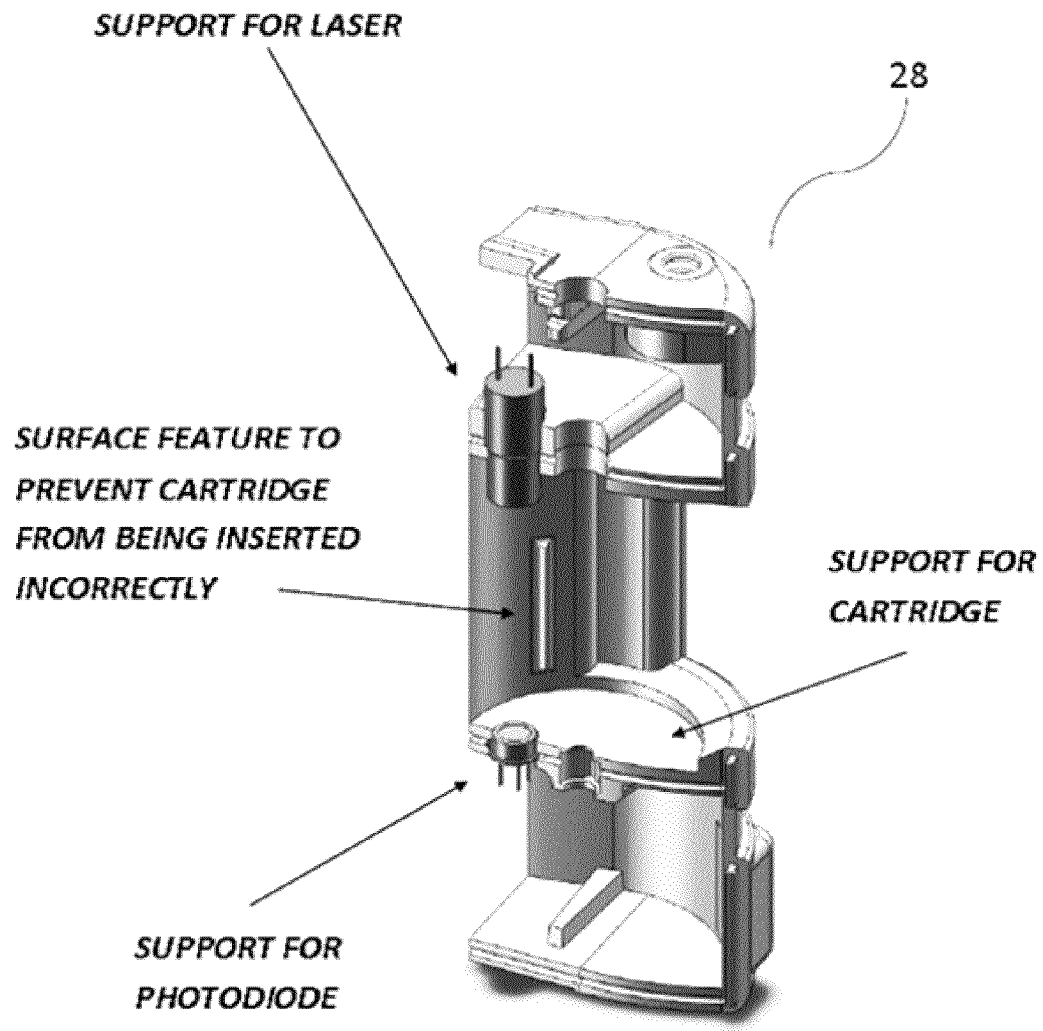

FIG. 9A schematically illustrates the improved portable DPM monitor of FIG. 2 in use, with an intake being positioned proximate a user's face, and the balance of the system being worn on the user's utility belt;

FIG. 9B schematically illustrates another exemplary embodiment of an improved portable DPM monitor in use, in which the elements of FIG. 2 have been incorporated into a safety helmet;

FIG. 9C schematically illustrates another exemplary embodiment of an improved portable DPM monitor in use, in which the elements of FIG. 2 have been incorporated into a single case to be worn on a user's chest; and FIG. 10 schematically illustrates an exemplary rigid support for a sampling cassette, a laser light source, and a photo detector as utilized in the improved portable DPM monitor of FIG. 2.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Figure 1:
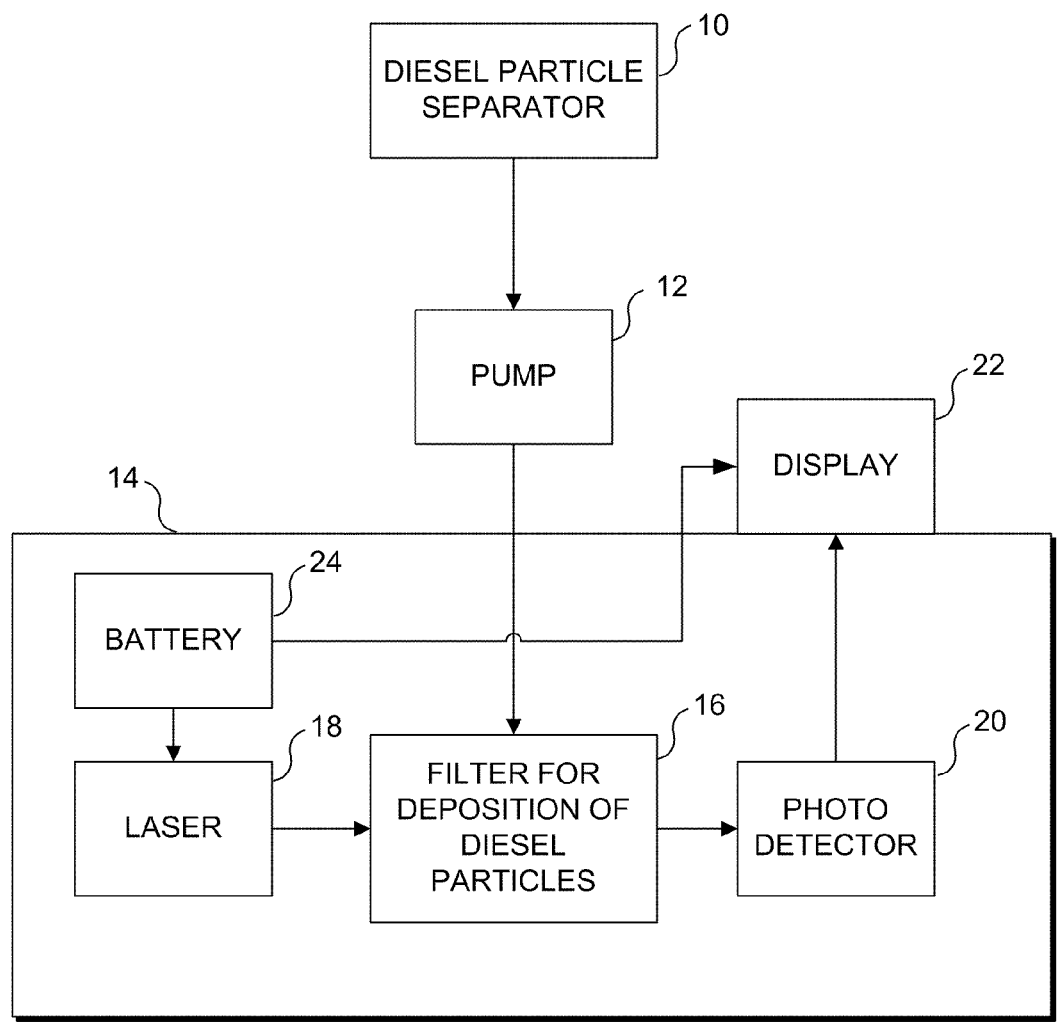
FIG. 1 is a functional block diagram of a Prior Art portable DPM monitor.

FIG. 1 is a functional block diagram of a Prior Art portable DPM monitor. This was a first generation device, lacking many of the components and features of the DPM monitors disclosed herein. In the first generation device, ambient air is drawn by a flow-controlled diaphragm pump 12 through a particle size selector 10 which only passes submicron particles. These particles are collected on an optically transparent filter 16. A laser 18 illuminates the filter and the transmittance of the laser beam is measured in real-time by a photo detector 20, which outputs data via a display 22. A battery 24 powers the device. Pump 12, size selector 10, and display 22 in the first generation device are disposed externally of a housing 14. the size of the device enabling the device to be worn by a miner (the housing and pump being attached to a utility belt).

The particle size selector (or intake component) can be beneficially implemented using a cyclone combined with an impactor. Such particle size selectors are readily available, and are often employed to collect samples that will be analyzed by the NIOSH 5040 method discussed above (which is not real-time detection, but relies on accumulating a sample for a period of hours or days, and then transporting the sample to a laboratory for analysis).

Described below are various enhancements to the first generation device.

FIG. 2 is a functional block diagram of an improved portable DPM monitor as disclosed herein. In this particular embodiment, the diesel particle separator element (particle size selector 10) is disposed externally of the housing; however, it should be recognized that other embodiments disclosed herein include the diesel particle separating components in the same housing as other components. Ambient air is drawn by flow-controlled diaphragm pump 12 (disposed inside of a housing 15) through a particle size selector 10 which functions as above to only pass submicron particles. These particles are collected on optically transparent filter 16 (preferably an inexpensive media, such as a polymer). Note that such a filter media need not be optically transmissive of all wavelengths, so long as the material is optically transmissive to the wavelength of the laser light source. An empirical device employed a Teflon™ filter. Laser 18 illuminates the filter and the transmittance of the laser beam is measured in real-time by a photo detector 20, which outputs data to a controller 25. Battery 24 powers the device. While as shown in FIG. 2 the battery is disposed inside of housing 15, it should be noted that other embodiments disclosed herein mount the battery on an external surface of the device, such that the battery can be replaced without having to open up the housing. This not only speeds up the process of replacing the battery, it also reducing the likelihood that dust and contaminants will enter the housing, where they could damage internal components.

Referring once again to FIG. 2, controller 25 is logically coupled to laser 18, photo detector 20, display 22 (which is integrated into the housing), battery 24, pump 12, a filter replacement door 26, and an optional alarm 29. Controller 25 can be implemented by hardware (such as a custom application specific integrated circuit) or by a combination of hardware and software (i.e., a microprocessor and memory in which machine instructions are stored). Controller 25 can be distinguished from prior art controllers based on the functions implemented by the controller. Controller 25 preferably implements a plurality of functions, including controlling a speed of the pump, controlling a gain of the photo detector, preventing the laser from firing if the sample door is open, manipulating the data from the photo detector to determine the EC detected, displaying EC on the display, manipulating the data from the photo detector to determine the TC detected, displaying TC on the display, manipulating the data from the photo detector to determine that the filter is saturated and requires replacement, displaying that the filter requires replacement on the display, and activating the alarm (one or more of an audible alarm, a warning light, a graphical display or a textual display) when a predetermined EC or TC level has been exceeded. It should be noted that these functions can be implemented in various combinations and permutations to achieve many different embodiments.

The DPM of FIG. 2 also includes a rigid support 28 for a sample cassette in which the filter is contained. Preferably, the support is configured to receive the sample cassette in only one orientation, so that the sample cassette cannot be improperly inserted. The sample cassette (an exemplary embodiment of which can be seen in FIGS. 4 and 6C) is in fluid communication with the pump and particle separator (the intake component), and with an exhaust port (not separately shown). Support 28 can be implemented using metal (such as aluminum) or rigid polymers. Preferably, the laser and photo detector are attached to support 28, to ensure they remain properly positioned relative to each other and the sample cassette. The sample cassette is accessible via sample door 26, which is logically coupled to controller 25, such that the laser will not fire unless the sample door is in the closed position.

Figure 3:
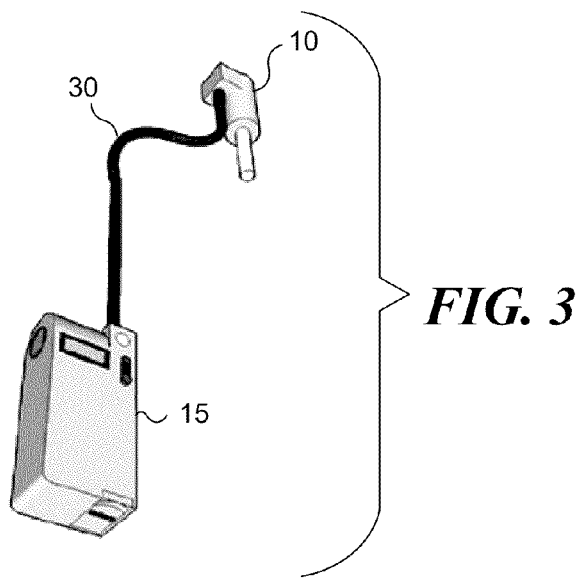
FIG. 3 is an artist's rendering of the improved portable DPM monitor of FIG. 2.

FIG. 3 is an artist's rendering of the improved portable DPM monitor of FIG. 2. In this embodiment, particle size separator 10 is disposed remote from housing 15. The particle size separator is worn on the chest in the breathing zone, and the housing is worn on a utility belt near or at the waist. Flexible tubing 30 connects the particle size separator to the main unit (i.e., housing 15).

Figure 4:
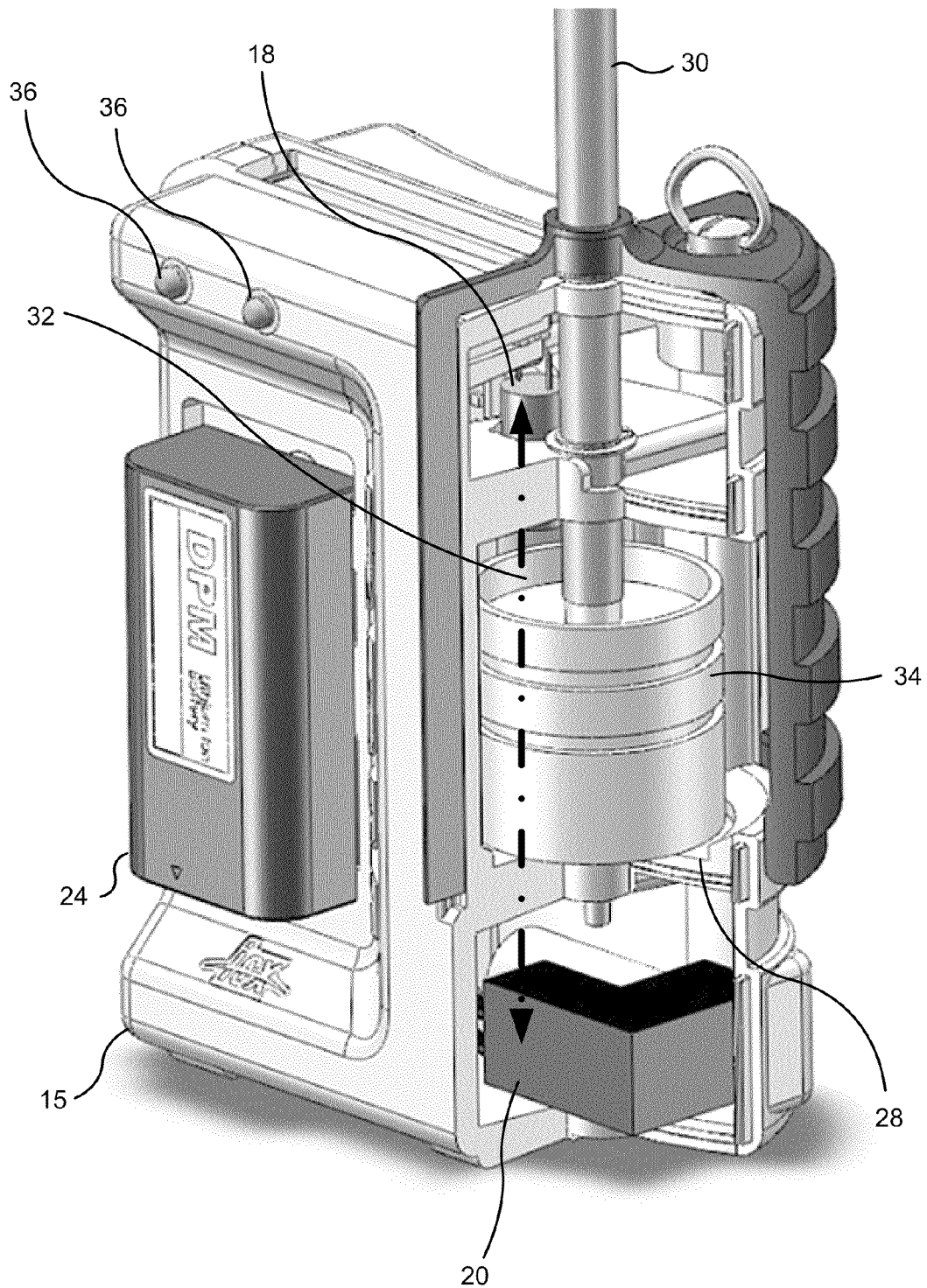
FIG. 4 is a cutaway view of another exemplary embodiment of an improved portable DPM, in which a battery is disposed on an external surface of a main housing.

FIG. 4 is a cutaway view of another exemplary embodiment of an improved portable DPM, in which battery 24 is disposed on an external surface of main housing 15. Flexible tubing 30 is used to place the intake component (particle size separator 10 of FIG. 2) in fluid communication with a sample cassette 32. Dashed line 32 illustrates that laser 18 and photo detector 20 (disposed on opposing sides of the filter contained in the sample cassette, which in an exemplary embodiment is formed of transparent plastic) are in line, such that light emitted by the laser (and attenuated by DPM deposited on the filter inside the sample cassette) will reach the photo detector. Portions of pump 12 and support 28 can be seen inside housing 15. The embodiment of FIG. 4 also includes lights 36 (one red and one yellow) controlled by the processor (i.e., controller 25), which are used to convey operational status info to the use (i.e., power on, low battery, saturated filter, DPM levels exceeded, DPM levels safe, as discussed elsewhere herein).

Figure 5A:
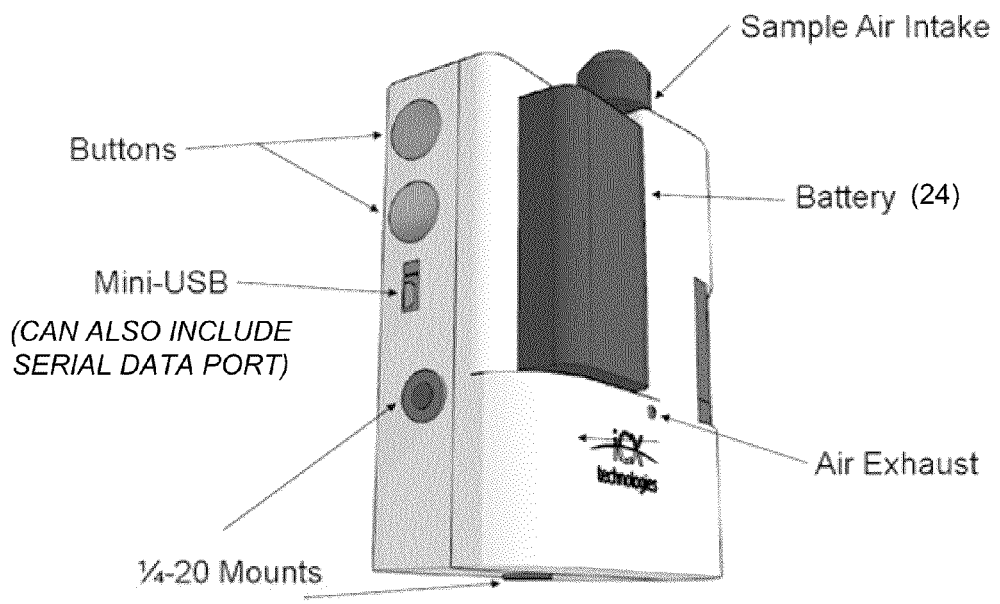
FIGS. 5A and 5B are side views of the improved portable DPM monitor of FIG. 4.
Figure 5B:
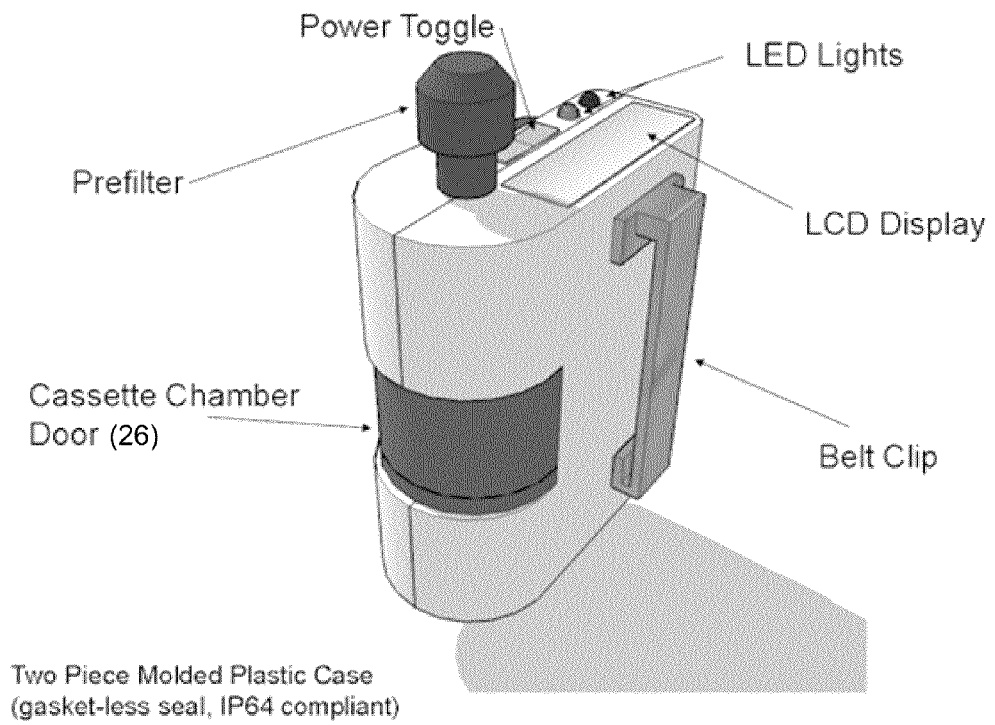

FIGS. 5A and 5B are side views of the improved portable DPM monitor of FIG. 4, enabling sample door 26 to be more readily visualized. Other elements shown in these Figures include the display, the external battery, a power button/toggle, an air exhaust (to allow air introduced into the sample cassette to escape after being filtered by the optically transmissive filter), an option pre-filter to ensure that only DPM is allowed to enter the sample cassette, LED status lights, a belt clip, a data port (preferably USB but other types of ports can be employed), user control buttons, and mounting hardware.

FIGS. 6A-6D are side views of the improved portable DPM monitor of FIG. 4, illustrating how the removable sampling cassette is implemented.

Figure 6A:
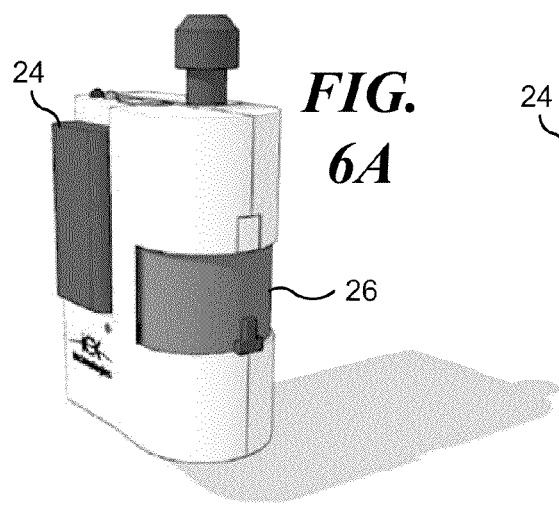
FIGS. 6A-6D are side views of the improved portable DPM monitor of FIG. 4, illustrating how the removable sampling cassette is implemented.

In FIG. 6A, sample door 26 is closed, and the sample cassette is isolated from the ambient environment. In embodiments in which the sample door is logically coupled to the controller, the laser will be able to fire because the sample door is closed.

Figure 6B:
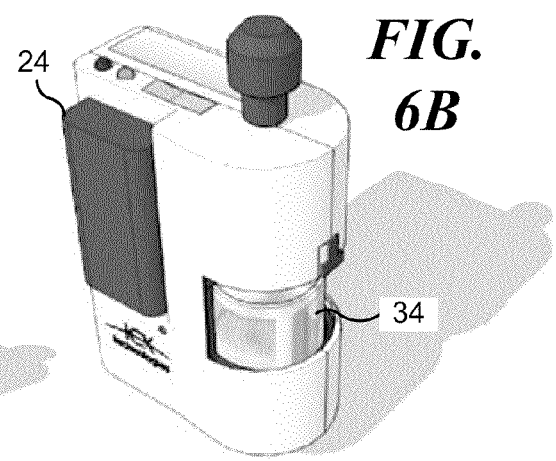

In FIG. 6B, sample door 26 has been opened (sliding upward into the housing so it cannot be clearly seen) and sample cassette 34 (including optically transmissive filter 16) is visible. In embodiments in which the sample door is logically coupled to the controller, the laser will not be able to fire because the sample door is open.

Figure 6C:
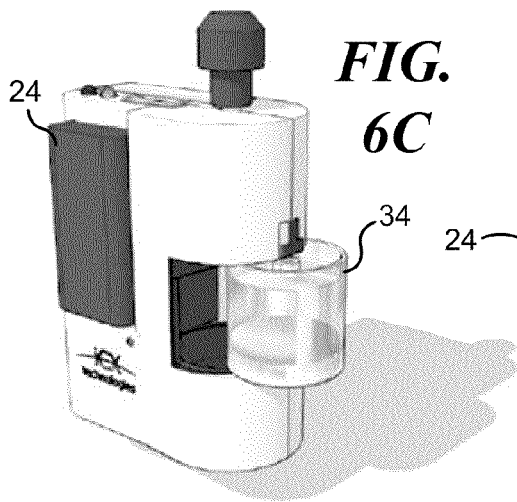

In FIG. 6C, sample door 26 is open and sample cassette 34 (including optically transmissive filter 16) is being removed. In general, the sample cassette will be removed between shifts and replaced with a fresh sample cassette, or whenever the controller determines that the filter has been saturated. In embodiments in which the sample door is logically coupled to the controller, the laser will not be able to fire because the sample door is open.

Figure 6D:
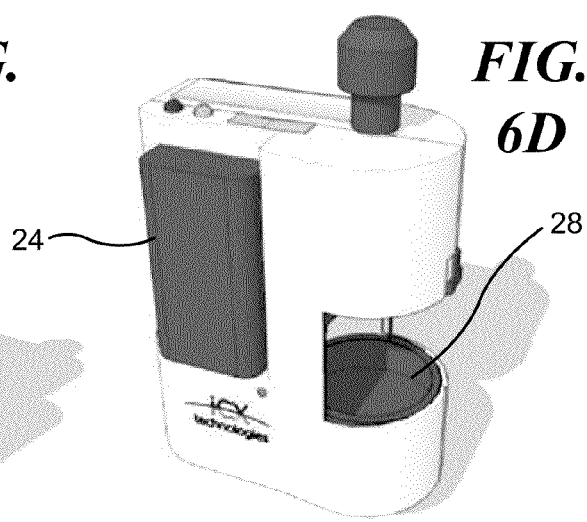

In FIG. 6D, sample door 26 is open and sample cassette 34 (including optically transmissive filter 16) has been removed, so that support 28 can be seen. In a preferred but not limiting embodiment support 28 has surface features preventing a sample cassette from being inserted in anything but a proper orientation. In embodiments in which the sample door is logically coupled to the controller, the laser will not be able to fire because the sample door is open.

Figure 7:
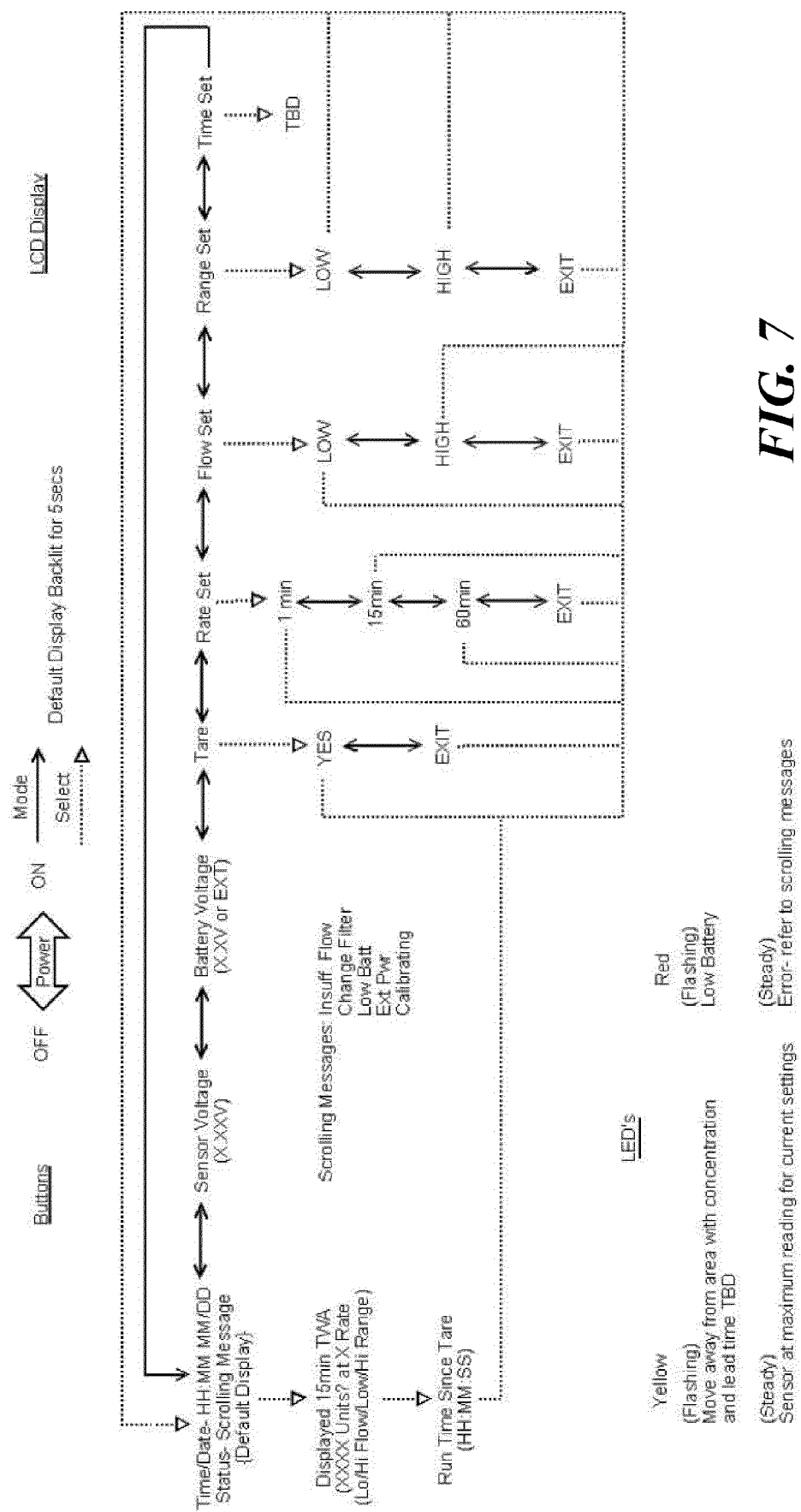
FIG. 7 is a logical diagram of exemplary functions implemented by a processor component in the improved portable DPM monitor of FIGS. 2 and 4.

FIG. 7 is a logical diagram of exemplary functions implemented by a processor component in the improved portable DPM monitor of FIG. 2 or 4. User selectable settings/functions include a tare initialization (obtaining an initial filter attenuation value, before DPM has been collected), a sample rate selection (exemplary but not limiting sample rates are per minute, per 15 minutes, and per hour), a pump flow rate selection (relatively high flow rates provide greater sensitivity but shorter filter life), a range/gain setting for the photo detector, and a time set function (enabling the user to set the current time/date, so that stored data is time indexed). In an exemplary embodiment, various messages are displayed to the user, as appropriate, including an insufficient flow message, a change filter message (saturated filter), a low battery message, a external power message (indicating the unit is operating on external power via a hardwired connection or USB power), and a calibrating message (indicating that the unit is undergoing a calibration cycle). DPM levels are preferably displayed as a time weighted average (TWA) value. In an exemplary embodiment, the controller uses red and yellow lights to output the following warnings: Flashing Red; low battery. Flashing Yellow; hazardous DPM levels, move away. Steady Red; Error, refer to scrolling messages on LCD display. Steady Yellow; sensor at maximum readings at current settings (prompting user to lower photo detector gain or pump flow rate). If desired, an audible alarm can also be provided when hazardous DPM levels are encountered.

Figure 8:
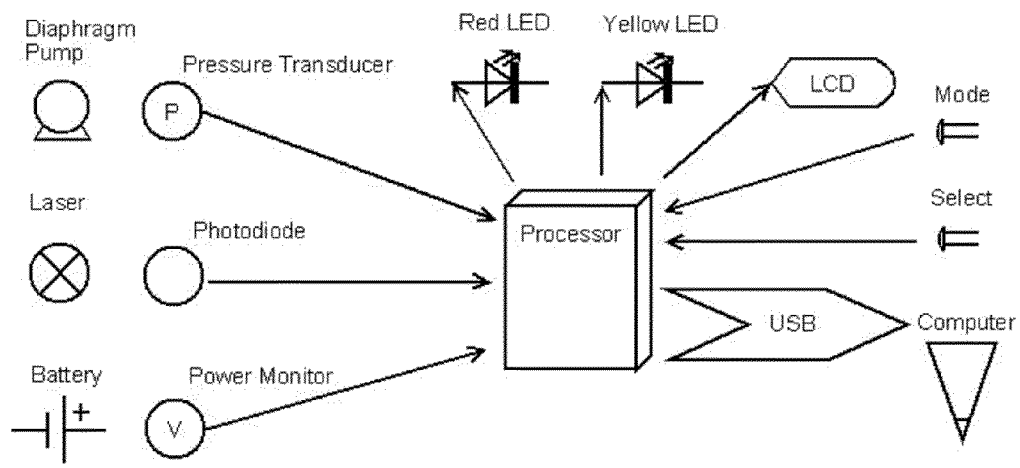
FIG. 8 is another logical diagram of exemplary functions implemented by a processor component in the improved portable DPM monitor of FIGS. 2 and 4.

FIG. 8 is another logical diagram of exemplary functions implemented by a processor component in the improved portable DPM monitor of FIG. 2 or 4. The processor is controllably connected to the display (such as an LCD), red and yellow warning lights (such as LEDs), a pressure transducer to measure flow rate (this component is preferably included in each of the embodiments disclosed herein to verify that sufficient flow rate is present, and to enable the attenuation measurements to be calibrated to provide EC and TC levels), the pump, the laser, the photo detector (preferably a photo diode), the battery, a power monitor (this component is preferably included in each of the embodiments disclosed herein), a data port (such as a serial port, a USB port, an Ethernet port, of a Wi-Fi modem) to enable data to be transferred to an external computing device, and mode select buttons to enable a user to access the various functions described in connection with FIG. 7.

FIG. 9A schematically illustrates the improved portable DPM monitor of FIG. 2 in use, with intake (i.e., particle size selector 10) being positioned proximate a user's face, and the balance of the system being worn on the user's utility belt (i.e., housing 15). Note the DPM monitor of FIG. 4 (external battery) can be similarly utilized.

FIG. 9B schematically illustrates another exemplary embodiment of an improved portable DPM monitor in use, in which the elements of FIGS. 2 and/or 4 have been incorporated into a safety helmet. This embodiment will require relatively light weight components, but removes items from a miner's utility belt, which is generally already being used for other safety related gear and tools.

FIG. 9C schematically illustrates another exemplary embodiment of an improved portable DPM monitor in use, in which the elements of FIGS. 2 and/or 4 have been incorporated into a single case to be worn on a user's chest. This embodiment will require relatively light weight components, but removes items from a miner's utility belt, which is generally already being used for other safety related gear and tools.

FIG. 10 schematically illustrates an exemplary implementation for rigid support 28 for the sample cassette, a laser light source, and a photo detector as utilized in the improved portable DPM monitor of FIG. 2.

Other details of the DPM are provided below.

The embodiments disclosed herein encompass real-time, wearable elemental carbon monitor designed to determine real-time diesel particulate levels in mines. The filter on which the particulates are captured is manually replaced (which takes only a few seconds) when it is fully loaded with black carbon. Its capacity is sufficient to operate for at least a full shift in even a very highly contaminated environment. A filter saturation alert is presented by the instrument, though the low cost of the filter cassette allows simply replacing the filter cassette after every shift in a mine.

The instrument manages to only collect DPM particles in two ways. First, many potentially interfering particles are removed by the particle size selector. Second, the use of light absorbance for the analysis focuses on detection of highly absorbing materials such as black carbon, rather than less absorbing materials such as silicates or condensed water.

In an exemplary embodiment, the instrument operates for up to 12 hours on a medium sized rechargeable lithium-ion battery. The unit has a real-time limit of detection of 15 $\mu g/m^3$ of EC using five minute averaging at a flow rate of 1.7 liters per minute (LPM). The dynamic range is 9-300 $\mu g/m^3$ at 1.7 LPM and 18-600 $\mu g/m^3$ at 0.85 LPM, expressed as an eight hour time weighted average. The sensitivity and dynamic range of the instrument may be adjusted for the operating conditions in three ways. First, the averaging time of the instrument may be adjusted to values between one and 60 minutes (values of one or five minutes are typically used in mine environments). Second, the pump flow rate may be set to a low (0.85 LPM) or high (1.7 LPM) value. Third, the photodiode has both high and low gain settings.

The DPM monitors disclosed herein preferably display real-time EC levels on an LCD display, and can also display TC levels (converted from the EC data using a user-supplied, mine-specific conversion factor as described in MSHA publications). EC can also be displayed as an eight hour time-weighted average. In addition to the real-time display, EC data is logged internally and can be downloaded to a personal computer with a USB port (or other data port). If the display is not desired, saturation and danger warning can be provided audibly or via colored lights, though it is believed that units with displays will be more useful.

Empirical data indicates that prototype devices achieve a nearly linear calibration curve comparing filter absorbance as a function of the EC level measured by the NIOSH 5040. Significantly, the real-time data collected by the prototype exhibits peaks in EC levels that can be correlated with the passage of diesel vehicles near the monitor.

Such monitors may be worn on a miner's belt, placed in or on a vehicle, or placed on a wall or table in an area where EC monitoring is desired. The intake and size selector may also be placed on the unit or remotely via conductive tubing. When activated, the unit will display and log the EC concentration until either the battery is exhausted or the filter is saturated. Usually, the battery is the limiting factor, such that the operating time of the instrument is determined by the battery capacity. A 4500 mAh battery will operate the unit for over 12 hours, though larger or smaller batteries and AC power may also be used.

The exposure limit alarm on the instrument can be used to alert the user when a set level of EC exposure has been reached. More commonly, the unit will be collected by a ventilation engineer or hygienist at the end of a shift or work period. The integrated exposure may be simply recorded at that time to yield an instant analog to a NIOSH 5040 test, without the need for outside lab analysis and a multi-week wait. Alternatively, some engineers will download the monitor's data (EC concentration as a function of time) to a personal computer, where they can correlate EC levels to the location of the miner, vehicles, or activity near the monitor's location. The locations in the mine or mine activities contributing to the greatest EC levels can be determined. If necessary, changes to personnel, vehicle use, or ventilation may be implemented to reduce EC concentrations. The monitor may then be used to instantly determine if the changes they made are having the desired effect on EC levels or allow them to implement different controls.

Real-time sampling allows ventilation engineers and hygienists to develop a comprehensive knowledge of the DPM levels in their mine. This newfound knowledge can be used to institute much more responsive and effective DPM control strategies. For the mine operator, the reduction in DPM sampling and analysis costs go right to the bottom line and a finer control of ventilation rates may be feasible, resulting in reduced energy usage and cost. The greater frequency of sampling enabled by the real-time monitor will also allow the operator to reduce the likelihood of being found out of compliance with DPM regulations and having to suffer the costs of such noncompliance. For the miners, the knowledge that a health threat is being monitored in real-time should be more assuring than only having the chance that this condition could be discovered weeks after it has taken place.

A key to the DPM monitor's performance is its ability to size-select atmospheric particulates (preferably employing a 0.8 μm cutoff) and the absorption technique used. This size cut avoids many potentially interfering particles, so the monitor can examine diesel-generated elemental carbon (EC) exclusively, and avoid interfering particles such as dust, oil mist, water vapor, and cigarette smoke.

The DPM monitors disclosed herein have been designed to met the following technical criteria:

Display real-time EC and TC status
Provide warning light to alert when EC levels spike
Provide warning light to indicate when cumulative EC reaches threshold
Employ a high accuracy photodiode
Integrate pump that operates at <70 dB at 1 meter
Integrate flash memory system for monitoring results
Enclose optics and filter in light-tight capsule
Incorporate a pre-filter to size-select particles<0.8 μm
Power with rechargeable Li battery and 120VAC
Experience no interference from cigarette smoke
Download data points via USB for PC analysis
Attach to miner for 12 hour shift
Display battery and flow status
Position intake within MSHA 30. CFR 70/71.208 breathing zone
Position exhaust beyond intake flow path in still air
Provide user access to battery and filter cassette
Provide adjustable sample flow rate: 0.8-2.0 LPM
Provide adjustable measurement interval: 1 Hz-1.3 mHz
Achieve collection efficacy of 50% of particles<0.8 μm
Attach to 2-3" utility belts The DPM monitors disclosed herein provide a >97.4% match to the 5040 test, yet do so on a minute-by-minute basis. What this means is that miners and managers may take action—such as activating auxiliary ventilation, exiting a mine compartment, closing cab windows, turning off diesel engines, donning a mask—before hazardous exposure levels are reached.

When the user turns on the DPM monitor, it automatically initiates a self-calibrating system check that verifies the viability of the system and filter. The system measures any residual EC on the filter and prompts the user to effectively zero the system for the new shift. At any time, the user may examine the monitor display to get a reading of cumulative EC exposure. A yellow LED on the unit automatically flashes when the user enters an area of unusually high EC concentration. The yellow LED remains on when the system detects the maximum EC exposure limit.

With real-time monitoring, the wearer can make the connection between rising EC levels and environmental variables. If the wearer is in a vehicle cab when EC rises, an obvious response is to close the windows. If the wearer is working in an enclosed mine compartment when the monitor warns of rising toxins, the wearer may exit the space. If the wearer sees a spike on the DPM monitor while in an open-pit mine, shutting down diesel equipment would be an appropriate response.

The DPM monitor places safety in the hands of miners. With exposure information available at a glance, users are able to take action to ensure their protection. This frees up miners to focus on their work safely.

The DPM monitors disclosed herein are elegantly simple. A diaphragm pump draws in ambient air at a set flow rate that enables the pre-filter to make a 0.8 μm size cut. Preferably, two pre-filter elements that work in tandem to make this size cut are a vertical cyclone and an impactor. These two elements allow only EC to be drawn through conductive tubing, which allows EC to reach the Teflon™ filter without sticking to the tubing walls. The small particles<0.8 μm (EC) collect on a Teflon™ filter in the path of a laser. A Teflon™ filter is housed in a specially designed cassette that includes a defined volume chamber, as well as carefully constructed flow paths to achieve uniform distribution of EC on the Teflon™ filter.

The laser measures the accumulating quantity of elemental carbon particulate on the filter then displays the measurement. Particulate-free clean air is reintroduced into the environment via the exhaust system. The DPM monitor operates in a wide range of environments quickly and efficiently. Multiple flow rates enable users to balance sensitivity with filter longevity.

Time and spatial resolution of DPM levels allows fast and effective modification of mine operations to control DPM levels. Because the measurements occur in real-time, users may take preventive action to avoid over-exposure to DPM rather than learn of an event post-exposure.

In addition to issuing DPM monitors to individual miners, mine owners can integrate the DPM monitor into HVAC systems to collect data detailing the performance of the ventilation system. Rather than running fans constantly just in case there is a problem, the DPM monitor can send a signal to the HVAC control system, so that backup ventilation systems are energized only when necessary. Deploying secondary ventilation on an as-needed basis saves energy and money.

The DPM monitor will reduce morbidity and mortality in real-world environments where diesel particle accumulation and exposure is problematic including:
- Loading docks
- Railroad stations
- Interior of school and other public busses
- Subway tunnels and inside subway cars
- Truck interiors
- Diesel automotive interiors
- Truck stops
- Ship yards
- Military armored fighting vehicle interiors
- Gas stations
- Transportation tunnels
- Heavy equipment cabs
- Border patrol stations
- Grain and agricultural products loading stations The DPM monitors disclosed herein are more than a novel mini-gadget. The product is transformative, in that it shifts testing from the laboratory to the actual working environment. With real-time, site-specific, person-specific information, feedback is immediate. Workers can see the direct consequences of their actions and avoid toxic conditions. The DPM monitor provides miners in high-risk situations with the information needed to remain healthy. This product empowers the individual to take immediate and practical actions to ensure personal safety. For mine owners the DPM monitor provides a tool for applying a preventative approach to a serious and costly safety issue. The instrument dramatically lowers the cost of EC testing. It also helps owners avoid the high costs of being out of compliance with governmental DPM regulations. For regulators, the DPM monitor is a non-threatening mutually beneficial solution to a health issue that businesses can embrace and regulators can trust.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A portable diesel particulate matter (DPM) monitor, comprising:
   (a) a portable housing including a sample cassette door;
   (b) an intake component that separates a DPM fraction from ambient air, the DPM fraction including DPM entrained in air;
   (c) a rigid sample cassette support disposed within the housing;
   (d) a replaceable sample cassette including an optically transmissive sampling substrate onto which DPM are uniformly deposited, the sample cassette being supported by the rigid sample cassette support and being accessible via the sample cassette door, the sample cassette being in fluid communication with the intake component;
   (e) a pump disposed in the housing and in fluid communication with the intake component and the sample cassette, enabling the DPM fraction to be introduced into the sample cassette;
   (f) a laser disposed in the housing and positioned to direct a beam of light onto the optically transmissive substrate;
   (g) a light detector disposed in the housing and positioned to receive the beam of light after the beam passes through the optically transmissive substrate, DPM deposited onto the substrate attenuating the beam;
   (h) a display for providing an indication of DPM to a user;
   (i) a controller disposed in the housing and logically coupled to the laser, the light detector, the display, and the pump, the controller implementing at least the function of using data from the light detector to provide an indication of DPM on the display; and
   (j) a battery for supplying power to the pump, the laser, the display, and the controller.

2. The DPM monitor of claim 1, wherein the rigid sample cassette support is configured such that the sample cassette can only be inserted into the sample cassette support in a proper orientation, to prevent a user from inadvertently inserting the sample cassette in an improper orientation.

3. The DPM monitor of claim 1, wherein the rigid sample cassette support also provides support for the laser and the light detector.

4. The DPM monitor of claim 1, wherein the sample cassette door is logically coupled to the controller, and the controller is further configured to prevent the laser from firing if the sample cassette door is not closed.

5. The DPM monitor of claim 1, wherein the controller is further configured to evaluate a signal from the light detector, to determine when the optically transmissive sampling substrate has been saturated with DPM, and to output an indication to a user that the sample cassette should be replaced.

6. The DPM monitor of claim 1, wherein the battery is removably coupled to an external surface of the housing, enabling the battery to be replaced without opening the housing.

7. The DPM monitor of claim 1, wherein each element of the DPM monitor is integrated into a helmet.

8. The DPM monitor of claim 1, wherein the intake component is disposed in the housing.

9. The DPM monitor of claim 1, further comprising memory in which data from the light detector can be stored, the memory being logically coupled to the controller.

10. The DPM monitor of claim 9, further comprising a serial port logically coupled to the controller, to enable data to be transferred to a remote device.

11. The DPM monitor of claim 9, further comprising a universal serial bus port logically coupled to the controller, to enable data to be transferred to a remote device.

12. The DPM monitor of claim 1, further comprising a networking component logically coupled to the controller, to enable data to be transmitted to a remote device.

13. The DPM monitor of claim 1, further comprising an alarm logically coupled to the controller, the controller being further configured to activate the alarm when at least one condition from the following group of conditions is met:
   (a) the optically transmissive sampling substrate has been saturated with DPM, and the sample cassette should be replaced; and
   (b) a predetermined DPM level has been exceeded.

14. The DPM monitor of claim 1, wherein the controller is further configured to change a flow rate of the pump based on user input, to enable a user to select a relatively higher flow rate optimized for sensitivity detection, and a relatively lower flow rate optimized for longevity of the optically transmissive sampling substrate.

15. The DPM monitor of claim 1, wherein the controller is further configured to change a gain setting of the light detector based on user input.

16. The DPM monitor of claim 1, wherein the controller is further configured to convert data from the light detector into an elemental carbon (EC) parameter, and to convert the EC parameter into eight hour time weighted carbon (TC) exposure levels, based on user input.

17. A portable diesel particulate matter (DPM) monitor, comprising:
- (a) a portable housing including a sample cassette door;
- (b) an intake component that separates a DPM fraction from ambient air, the DPM fraction including DPM entrained in air;
- (c) a sample cassette support disposed with the housing;
- (d) a replaceable sample cassette including an optically transmissive sampling substrate onto which DPM are uniformly deposited, the sample cassette being supported by the sample cassette support and being accessible via the sample cassette door, the sample cassette being in fluid communication with the intake component;
- (e) a pump in fluid communication with the intake component and the sample cassette, enabling the DPM fraction to be introduced into the sample cassette;
- (f) a laser disposed in the housing and positioned to direct a beam of light onto the optically transmissive substrate;
- (g) a light detector disposed in the housing and positioned to receive the beam of light after the beam passes through the optically transmissive substrate, DPM deposited onto the substrate attenuating the beam;
- (h) a display for providing an indication of DPM to a user;
- (i) a controller disposed in the housing and logically coupled to the laser, the light detector, the display, the pump, and the sample cassette door, the controller implementing at least the following functions:
    - (i) using data from the light detector to provide an indication of DPM on the display;
    - (ii) evaluate a signal from the light detector, to determine when the optically transmissive sampling substrate has been saturated with DPM, and to output an indication to a user that the sample cassette should be replaced;
    - (iii) change a flow rate of the pump based on user input, to enable a user to select a relatively higher flow rate optimized for sensitivity detection, and a relatively lower flow rate optimized for longevity of the optically transmissive sampling substrate; and
    - (iv) preventing the laser from firing if the sample cassette door is not closed; and
- (j) a battery for supplying power to the pump, the laser, the display, and the controller.

18. The DPM monitor of claim 17, wherein the battery is removably coupled to an external surface of the housing, enabling the battery to be replaced without opening the housing.

19. A portable diesel particulate matter (DPM) monitor, comprising:
- (a) a portable housing including a sample cassette door;
- (b) an intake component that separates a DPM fraction from ambient air, the DPM fraction including DPM entrained in air;
- (c) a sample cassette support disposed with the housing;
- (d) a replaceable sample cassette including an optically transmissive sampling substrate onto which DPM are uniformly deposited, the sample cassette being supported by the sample cassette support and being accessible via the sample cassette door, the sample cassette being in fluid communication with the intake component;
- (e) a pump in fluid communication with the intake component and the sample cassette, enabling the DPM fraction to be introduced into the sample cassette;
- (f) a laser disposed in the housing and positioned to direct a beam of light onto the optically transmissive substrate;
- (g) a light detector disposed in the housing and positioned to receive the beam of light after the beam passes through the optically transmissive substrate, DPM deposited onto the substrate attenuating the beam;
- (h) an alarm for alerting a user of a predetermined condition;
- (i) a controller disposed in the housing and logically coupled to the laser, the light detector, the alarm, and the pump, the controller implementing at least the following functions:
    - (i) evaluating a signal from the light detector, to determine when the optically transmissive sampling substrate has been saturated with DPM, and to activate the alarm to advise a user that the sample cassette should be replaced; and
    - (ii) evaluating a signal from the light detector, to determine when a safe level of DPM has been exceeded, and to activate the alarm to advise a user that an unsafe level of DPM has been detected; and
- (j) a battery for supplying power to the pump, the laser, the alarm, and the controller.

20. The DPM monitor of claim 19, wherein the sample cassette door is logically coupled to the controller, and the controller is further configured to prevent the laser from firing if the sample cassette door is not closed.

* * * * *